United States Patent Office 2,771,487
Patented Nov. 20, 1956

2,771,487

TERTIARY ALKYL SUBSTITUTED CYCLOHEXANE CARBOXYLIC ACIDS, DERIVATIVES THEREOF, AND METHOD FOR PRODUCING THE SAME

Rupert C. Morris, Berkeley, and Vernon W. Buls, Walnut Creek, Calif., assignors to Shell Development Company, Emeryville, Calif., a corporation of Delaware No Drawing. Application December 26, 1950, Serial No. 202,814

6 Claims. (Cl. 260—514)

This invention relates to a new class of organic acids and to their preparation. More particularly, the invention relates to novel tertiary alkyl substituted cyclohexane carboxylic acids and derivatives thereof, and to the preparation of the said acids by catalytic hydrogenation of a corresponding tertiary alkyl substituted aromatic derivative.

Specifically, the invention provides new and particularly useful cyclohexane carboxylic acids having at least one ring carbon atom joined to a tertiary alkyl radical, said acids being prepared by contacting an alkaline aqueous solution of a relatively water soluble salt of the corresponding tertiary alkyl substituted aromatic acid with hydrogen at an elevated pressure and temperature above 150° C. in the presence of a hydrogenation catalyst, such as Raney nickel, and subsequently converting the resulting salt to the acid form. The invention further provides useful derivatives of these substituted cyclohexane carboxylic acids, particularly their esters, salts, acid chlorides and amides. The invention also provides compositions, particularly herbicidal, fungicidal and insecticidal compositions and various resinous compositions, containing the aforedescribed acids and derivatives.

It is an object of the invention to provide a new class of organic acids. It is a further object to provide novel tertiary alkyl substituted cyclohexane carboxylic acids having many unique properties which make them particularly useful and valuable in industry. It is a further object to provide novel tertiary alkyl substituted cyclohexane carboxylic acids which are valuable as improved modifiers for alkyd-type resins. It is a further object to provide novel tert-alkyl cyclohexane carboxylic acids which are outstanding as additives for herbicidal, fungicidal and insecticidal compositions. It is a further object to provide an efficient and practical method for preparing cyclohexane carboxylic acids from a corresponding aromatic derivative. It is still a further object to provide a method for preparing substituted cyclohexane carboxylic acids made up predominantly of either of their two stereoisomers. It is a further object to provide new and valuable derivatives of the aforedescribed acids. It is still a further object to provide useful compositions containing the aforedescribed acids and derivatives. Other objects and advantages of the invention will be apparent from the following detailed description thereof.

It has now been discovered that these and other objects may be accomplished in part by cyclohexane carboxylic acids having at least one ring carbon atom joined to a tertiary carbon atom contained in an alkyl radical. These acids have many physical and chemical properties which are surprisingly different from the properties of cyclohexane carboxylic acids or the straight chain substituted cyclohexane carboxylic acids. These unobvious properties may be attributed to the unique atomic configuration which characterizes all of the novel acids of the present invention. As is apparent, the novel acids contain a quaternary carbon atom, i. e. a carbon atom which is linked through single valence bonds to four other carbon atoms, at the junction of the cyclohexane ring and the tertiary alkyl side chain, and the presence of this unique structure endows the compounds with unobvious properties. The acids are, for example, finely crystalline solids which possess relatively high melting points and may be stored indefinitely without undergoing any deleterious change in their physical form. The novel acids possess an unusually high degree of solubility in various organic oils and resins and are valuable as additives or modifiers, particularly for resins of the alkyd type. Alkyd resins modified with these acids form coating compositions which are extremely hard and scratch resistant. The acids of the invention are also of particular value as additives for pesticidal and particularly herbicidal compositions. The acids possess an unexpected activity toward many detrimental organisms and endow compositions such as the herbicidal compositions with increased ability to penetrate the plant structure and thus greatly increase the effectiveness of those compositions.

As indicated, the novel acids of the invention comprise cyclohexane carboxylic acids having one or more of their ring carbon atoms directly joined to a tertiary alkyl radical. These acids will be referred to herein generically as "tertiary alkyl substituted cyclohexane carboxylic acids." The expression "tertiary alkyl" as used throughout the specification and claims in relation to the side chain refers to alkyl radicals wherein the alpha carbon atom, i. e., the carbon atom joined to the free bond of the radical, is a tertiary carbon atom. The other portion of the alkyl side chain may, and preferably is in some cases as indicated below, highly branched, i. e., the remaining carbon atoms may be tertiary or quaternary carbon atoms. The novel acids may be monocarboxylic or polycarboxylic and the cyclohexane ring may be further substituted with substituents, such as lower straight chain alkyl radicals.

As the novel acids of the invention contain at least two substituents on the cyclohexane ring they may exist in the form of stereoisomers, i. e., as a "cis" or "trans" isomer depending on the position of the substituents in relation to the plane of the cyclohexane ring. These isomers may generally be distinguished by their melting points and/or solubility characteristics. Unless otherwise specified, the names of acids and derivatives cited in the specification and claims refer in a generic sense to both isomers and mixtures thereof.

Illustrative examples of the novel acids of the invention are 4-tert-butylcyclohexanecarboxylic acid, 5-tert-amylcyclohexanecarboxylic acid, 4-tert-decylcyclohexanecarboxylic acid, 3,5-di-(tert-octyl)cyclohexanecarboxylic acid, 4-tert-tetradecylcyclohexanecarboxylic acid, 2-hydroxy-3-tert-pentadecylcyclohexanecarboxylic acid, 4-tert-dodecyl-1,3-cyclohexanedicarboxylic acid, 2-amino-4-tert-octadecylcyclohexanecarboxylic acid, 2,4-di(tert-octyl)-1,5-cyclohexanecarboxylic acid, 4-(1,1,3,3-tetramethylbutyl)cyclohexanecarboxylic acid, 4-(1,1,3,3,5,5-hexamethylhexyl)cyclohexanecarboxylic acid, 3,5-di(tert-decyl)cyclohexanecarboxylic acid, and 2,5-dimethyl-4-tert-hexadecylcyclohexanecarboxylic acid.

Preferred acids are the tertiary alkyl substituted cyclohexane monocarboxylic acids wherein the tertiary alkyl side chain contains from 4 to 25 carbon atoms, such as 4-tert-octylcyclohexanecarboxylic acid, 4-tert-octadecylcyclohexanecarboxylic acid, 3-tert-docosanylcyclohexanecarboxylic acid, 3,5-di(tert-decyl)cyclohexanecarboxylic acid, 3-amino-5-tert-tetradecylcyclohexanecarboxylic acid, and 4-(1,1,3,3-tetramethylhexyl)cyclohexanecarboxylic acid.

Coming under special consideration, particularly because of their unique properties as modifiers for alkyd-type resins, are the tertiary alkyl substituted monocarboxylic acids wherein the tert-alkyl side chain contains at least 6 and preferably from 8 to 18 carbon atoms and contains at least one and preferably two or more carbon atoms other than the alpha carbon atom which is or are joined to more than two other carbon atoms, i. e., contains additional tertiary or quaternary carbon atoms, such as, 4 - (1,1,3,3 - tetramethyloctyl)cyclohexanecarboxylic acid, 4-(1,1,3,3,5,5-hexaethyldecyl)cyclohexanecarboxylic acid.

Acids having exceptionally fine properties as modifiers for alkyd-type resins also include the cyclohexanecarboxylic acids wherein at least two and preferably 2 to 3 of the ring carbon atoms are joined to tertiary alkyl radicals each containing from 4 to 18 carbon atoms, such as 3,5-di(tert-octyl)cyclohexanecarboxylic acid, 2,5-di(tert-decyl)cyclohexanecarboxylic acid, 3,5 - di(tert-butyl)cyclohexanecarboxylic acid, and 2,3,5-tri(tert-octyl)cyclohexanecarboxylic acid.

Preferred acids having outstanding properties as additives for herbicidal, fungicidal and insecticidal compositions are the cyclohexanemonocarboxylic acids possessing a single ring of 6 aliphatic carbon atoms wherein one of the said ring carbon atoms is joined to a carboxyl group and another ring carbon atoms, preferably in the para position thereto, is joined to a tert-alkyl radical containing from 4 to 20 carbon atoms, and the remaining ring carbon atoms are joined to a member of the group consisting of hydrogen and lower straight chain alkyl radicals, such as those containing from 1 to 4 carbon atoms.

The lower melting isomer of the above-described acids are generally more preferred, particularly because they generally have greater solubility and compatibility with the other organic materials.

The above-described tertiary-alkyl substituted cyclohexanecarboxylic acids are prepared by a novel process involving the hydrogenation of a corresponding tertiary-alkyl substituted aromatic derivative. Cyclohexanecarboxylic acids have been produced heretofore by hydrogenating an ester of the corresponding aromatic acid, such as ethyl benzoate, and then hydrolyzing the resulting ester to the acid form. It has been found, however, that this type of process is not satisfactory for the preparation of the tertiary-alkyl substituted cyclohexanecarboxylic acids of the present invention. The presence of the quaternary carbon atom at the junction of the side chain and aromatic ring appears to interfere with the hydrogenation and makes the aromatic ring difficult if not impossible to saturate under the ordinary conditions.

It has now been found unexpectedly that the tertiary alkyl substituted aromatic acids may be easily and efficiently hydrogenated to the corresponding tertiary-alkyl substituted cyclohexanecarboxylic acid by a novel process comprising contacting an alkaline aqueous solution of a relatively water soluble salt of the said aromatic acid, such as an alkali metal salt of the aromatic acid, with hydrogen at an elevated pressure and temperature above 150° C. in the presence of a hydrogenation catalyst, such as Raney nickel, and subsequently converting the resulting salt to the acid form. It was also surprisingly found that by varying the temperature as indicated hereinbelow this process could be made to yield predominant quantities of either of the desired stereoisomers of the resulting cyclohexanecarboxylic acids.

The acids whose salts are employed in the above-described novel hydrogenation process are those corresponding to the afore-described tertiary-alkyl substituted cyclohexanecarboxylic acid wherein the cyclohexane ring is replaced by an aromatic ring. They may be exemplified by tertiary-butylbenzoic acid, tertiary-octylbenzoic acid, 3,5-di(tert-octyl)benzoic acid, tert-dodecylbenzoic acid, and 5-tert-octylphthalic acid.

The salts employed in the process are those that are relatively water soluble, e. g., those that have a solubility of at least 0.5 part per 100 parts of water at 20° C. Preferred salts to be employed are the alkali and alkaline earth metal salts and ammonium salts of the afore-described acids, such as sodium tert-butylbenzoate, potassium tert-amylbenzoate, ammonium tert-butylbenzoate, calcium tert-octylbenzoate, and the like.

As indicated, the hydrogenation should be accomplished in an alkaline medium, e. g. a reaction medium having a pH of at least 7.3. Periodic change to a neutral solution is not too detrimental but acid medium should be avoided in all cases.

The quantity of the aromatic acid salt employed in the reaction medium may vary over a considerable range depending chiefly on the solubility of the particular salt to be hydrogenated. Saturated solutions of the salts that have only limited solubility are generally preferred. In most cases the quantity of the salt will vary from about 0.25 mol to 5 mols per 1000 parts by weight of solution, and more preferably from 0.5 mol to 2 mols per 1000 parts by weight of solution.

Suitable hydrogenation catalysts include the metals, such as copper, chromium, thallium, nickel, iron cobalt, tungsten, molybdenum, cerium, thorium, and the like. These are effective when employed in a finely divided state or deposited on an inert substance or carrier, such as pumice, silica gel, kieselguhr, charcoal, calcium carbonate, and the like. Other catalysts include the oxides or sulfides of the above-described metals, or mixtures comprising two or more metal oxides and/or sulfides, or one or more metal oxides or sulfides with one or more metals. Compound catalysts comprising two or more metals in admixture or alloyed as, for example, silver-copper, copper-chromium, copper-zinc, nickel-cobalt, and nickel-zinc, may also be used. Preferred catalysts are metals selected from the group consisting of nickel, iron, cobalt, copper, chromium, thallium, and their metal oxides and sulfides. Excellent results are generally obtained by employing a finely divided pyrophoric metal catalyst, such as Raney nickel, and such catalysts are usually the more preferred.

The amount of the catalyst employed may vary over a considerable range depending upon the type of catalyst employed, the substituted aromatic acid to be reduced, etc. In general, the amount of the catalyst will vary from 1% to 50% by weight of the organic reactants. Preferred amounts of catalyst range from 1% to 30% by weight. When Raney nickel is employed, it is generally employed in amounts varying from 1% to 20% by weight.

The catalyst is usually added directly to the aqueous solution of the salt and suspended therein by agitation. The usual procedure is to place the acid salt, water and catalyst in a suitable reaction vessel, to sweep out the atmospheric gases with hydrogen and subsequently force hydrogen from a continuous source into the vessel under pressure. Relatively low pressures, e. g., 500 to 1000 pounds per square inch are generally effective. Higher pressures, e. g., 1000 to 3000 pounds are correspondingly more effective and are generally the more preferred. Particularly preferred pressures range from 1000 to 2000 pounds per square inch. When the vessel is not continuously connected with a source of hydrogen under pressure, it may be desirable to make one or more additions of hydrogen during the reaction.

The temperature employed in the hydrogenation process should be 150° C. or above. The exact temperature range employed will depend chiefly upon the particular stereoisomer of the acid desired. It has been found that when the temperature is maintained within the lower range, i. e., from 150° C. to about 190° C. the low melting or cis form of the acid is obtained in predominate quantities. When the higher temperatures, e. g., from 190° C. to 300 C., are utilized the higher melting or trans form of the acid is obtained in predominate quantities.

Following hydrogenation, the catalyst and other solid material which may be present may be separated by filtering or centrifuging the reaction mixture. The acid salt formed in the hydrogenation process may be converted to the desired acid form while the salt is still in the reaction mixture or after it has been separated by any of the conventional means, such as by treating the salt with an acid as hydrochloric acid.

The apparatus employed in the hydrogenation process may be of any construction or design as long as it provides means for introducing and maintaining hydrogen at the desired pressure and means for maintaining the proper temperature. The conventional steel autoclave has proved very satisfactory for this process. The process may be conducted in a batchwise, semi-continuous or continuous manner.

For clarity, the above-described process has been described in terms of the hydrogenation of only the salts of the tertiary alkyl substituted aromatic acids but it may also be used with great success for the hydrogenation of the salts of other aromatic acids, such as the salts of benzoic acid and the other straight chain or secondary alkyl substituted acids as toluic acid, which are more easily hydrogenated. When these salts are employed, the above-described conditions will be applied as in the case of the hydrogenation of the tertiary alkyl substituted acid salts. In the case of the straight chain or secondary alkyl substituted aromatic acid salts, it is apparent that the process will produce two stereoisomers and the process can be made to produce predominant quantities of either isomer by varying the temperature as indicated hereinabove.

The novel tertiary alkyl substituted cyclohexanecarboxlic acids of the present invention are high melting crystalline solids which possess many unobvious properties enabling them to be utilized for important applications in industry. As indicated, the novel acids and particularly those containing at least two tertiary alkyl side chains or those having a tertiary alkyl side chain containing from 8 to 18 carbon atoms have good solubility characteristics and are particularly valuable as additives and modifiers for materials such as resins of the alkyd type. Alkyd resins containing these acids have increased compatibility with the usual lacquer solvents and in combination with nitrocellulose produce films which when cured are very hard and scratch resistant and have outstanding resistance to outdoor conditions.

The novel acids also possess definite activity toward various organisms and may be employed with success as ingredients in insecticidal, fungicidal and herbicidal spray and dust compositions. They are particularly valuable as additives for herbicidal compositions as they are highly compatible with the usual oils employed therein and endow the composition with increased ability to penetrate the plant structure.

The tertiary alkyl substituted carboxylic acids of the present invention are also of value as intermediates in the production of many useful and valuable derivatives, such as salts, esters, acid halides and amides. Salts of these acids and metals, such as cobalt, iron, manganese and lead may be used, for example, as paint driers and as stabilizers for polymers, such as poly(vinyl chloride). Salts of the acids and metals, such as copper and mercury, may be used as improved insecticides and wood preserving agents, or as additives for lubricating oils to increase the load carrying capacity of oil films or to prevent piston ring sticking in internal combustion engines. Other useful salts include the sodium, potassium, aluminum, barium, cadmium, magnesium, nickel, tin and vanadium salts.

Amides of the acids of the invention are of value as insecticides, fungicides or herbicides or as additives for insecticidal, fungicidal, or herbicidal compostions. The amides are also useful as additives for resinous compositions, particularly those of the alkyd-type or as plasticizers or lubricants. Amides containing an unsaturated group may be polymerized with themselves or with other polymerizable unsaturated compounds to produce resins having unique properties. These amides may be prepared by reacting the desired amine with the substituted cyclohexanecarboxylic acid, their anhydride or acid halide according to conventional procedure. Amines that may be used in this type of reaction include allyl amine, methallyl amine, isopropyl amine, decyl amine, dodecyl amine, phenyl amine, cyclohexylamine, and the like.

Esters having beneficial properties may be derived from the novel acids of the invention by esterifying them with monohydric or polyhydric alcohols, or phenols. Such compounds include methanol, ethanol, butanol, amyl alcohol, octyl alcohol, nonyl alcohol, cyclohexanol, cyclopentanol, allyl alcohol, methallyl alcohol, butenol, cyclohexanol, phenol benzyl alcohol, glycol monobutyrate, glycerol diacetate, ethylene glycol, propylene glycol, 1,5-pentanediol, glycerol pentaerythritol, 1,2,6-hexanetriol, butanediol, 2,8-dodecanediol, glycerol monoethyl ether, glycerol allyl ether, tetrahydroxycyclohexane, 3,3'-thiodipropanol, 4,4'-thiodibutanol, polyallyl alcohol, polyvinyl alcohol, polymethallyl alcohol, and polyols formed by the condensation of bis phenols with epichlorohydrin, and the like.

Esters having exceptionally fine properties as plasticizers, particularly for the vinyl halide and vinylidene halide polymers, are those obtained by esterifying the novel acids with monohydric aliphatic alcohols containing at least five carbon atoms and preferably from 5 to 18 carbon atoms, or polyhydric aliphatic alcohols, preferably containing from 2 to 8 carbon atoms, such as hexyl alcohol, octyl alcohol, dodecanol, tetradecanol and octadecanol, ethylene glycol, glycerol, pentaerythritol, mannitol, 1,2,5-hexanetriol, and the like.

Esters derived from the novel acids and alcohols containing an unsaturated linkage, e. g. an ethylenic linkage, come under special consideration as they may be polymerized by themselves or with other polymerizable unsaturated organic compounds to produce valuable resins. Preferred alcohols to be used in preparing these esters include the beta,gamma-ethylenically unsaturated monohydric alcohols containing from 3 to 18 carbon atoms.

To illustrate the manner in which the invention may be carried out the following examples are given. It is to be understood, however, that the examples are for the purpose of illustration and the invention is not to be regarded as limited to any of the specific conditions or reactants cited therein. Unless otherwise specified, parts described in the examples are parts by weight.

Example I

An aqueous solution of sodium p-tert-butylbenzoate was prepared by dissolving 36 parts of p-tert-butylbenzoic acid in water containing 9 parts of sodium hydroxide. This mixture was alkaline to litmus. About 10 parts of Raney nickel was then added to 200 parts of this solution and the resulting mixture exposed to 1000 pounds hydrogen pressure at a temperature of about 175° C. The aromatic derivative hydrogenated very satisfactorily and an absorption of about 93% of theory was obtained in a very short period. When no further reduction in pressure took place the product was recovered by filtration and subsequently acidified with hydrochloric acid. The solid that separated was filtered and dried. When recrystallized from dilute alcohol (20% water) it was found that approximately 20% of the solid was a high-melting solid (melting point of about 174.5° C. to 175.5° C.) while the remainder was somewhat more soluble in the solvent and melted at 89.5° C. to 90.5° C. Analysis of the recrystallized acid showed it to be 4-tert-butylcyclohexanecarboxylic acid: percent carbon, calcd. 71.6, found 72.6; percent hydrogen, calcd. 10.9, found 10.51; acid value, eq./100 g. calcd. 0.542, found 0.541.

Attempts made to prepare 4-tert-butylcyclohexanecarboxylic acid by hydrogenating p-tert-butylbenzoic acid and its esters, such as ethyl p-tert-butylbenzoate, according to conventional procedure were unsatisfactory. When p-tert-butylbenzoic acid in dioxane was exposed to hydrogen in the presence of Raney nickel at 175° C., there was no noticeable absorption of hydrogen. When the ethyl p-tert-butylbenzoate was exposed to 1000 pounds of hydrogen pressure at 150° C. in the presence of Raney nickel, the hydrogenation took place very slowly and the material was saturated only after about 40 hours.

*Example II*

4-tert-butylcyclohexanecarboxylic acid made up predominantly of the higher melting isomer, i. e., the trans isomer, was prepared by using a higher reaction temperature according to the following procedure. About 900 parts of sodium p-tert-butylbenzoate was added to about 3000 parts of water containing 150 parts of Raney nickel and the resulting mixture exposed to 1500 pounds' hydrogen pressure at a temperature of about 200° C. The absorption of hydrogen occurred at a rapid rate at this temperature. When no further reduction in pressure took place the product was recovered by filtration and acidified. The solid that separated was filtered and dried. When recrystallized from dilute alcohol it was found that approximately 90% of the solid was the high melting isomer (M. P. 174.5–175.5° C.) and the remaining 10% was the low melting isomer. Analysis of the high melting isomer showed it to be 4-tert-butylcyclohexanecarboxylic acid: percent carbon, calcd. 71.6, found 71.65; percent hydrogen, calcd. 10.9, found 10.96; acid value, eq./100 g. calcd. 0.107, found 0.118.

The lower melting isomer was readily converted into the high melting isomer by dissolving the lower melting product in 5% excess sodium hydroxide and heating the mixture in the presence of Raney nickel at 225° C. and 1500 pounds hydrogen pressure for 18 hours. On acidifying and recovering the acid it was found to melt at 173° C.

The mixture of stereoisomers produced above has been found to have outstanding properties as an additive for herbicidal compositions.

*Example III*

An aqueous solution of potassium tert-octylbenzoate is prepared by dissolving 400 parts of tert-octylbenzoic acid in 1000 parts of potassium hydroxide solution. About 10 parts of Raney nickel is then added to 200 parts of the above-described solution and the resulting mixture exposed to 1500 pounds' hydrogen pressure at a temperature of about 150° C. When no further reduction in pressure takes place the product is recovered by filtration and subsequently acidified. The solid that separates is filtered and dried. The material that is recovered after recrystallization from dilute alcohol is identified as tert-octylcyclohexanecarboxylic acid.

Glyceryl-phthalate alkyd resins modified with this acid have excellent compatibility with film-forming materials and solvents and plasticizers employed therewith. Nitrocellulose lacquers containing such alkyds have good gloss and hardness and have excellent resistance to outdoor conditions.

Acids having related properties are obtained by substituting the following acids for tert-octylbenzoic acid in the above-described process: tert-amylbenzoic acid, tert-dodecyl-benzoic acid and tert-tetradecylbenzoic acid.

*Example IV*

An aqueous solution of sodium 3,5-di(tert-butyl) benzoate is prepared by dissolving 350 parts of 3,5-di (tert-butyl)benzoic acid in 1000 parts of a sodium hydroxide solution. About 10 parts of Raney nickel is then added to 200 parts of the above-described solution which is slightly alkaline and the resulting mixture exposed to 1000 pounds' hydrogen pressure at a temperature of about 175° C. When no further reduction in pressure took place the product was recovered by filtration and subsequently acidified with hydrochloric acid. The solid that separates is filtered and dried. The material that is recovered after recrystallization from dilute alcohol is identified as 3,5-di(tert-butyl)cyclohexane-carboxylic acid.

Acids having related properties are obtained by substituting the following acids for 3,5-di(tert-butyl)benzoic acid in the above-described process: 3,5-di(tert-octyl) benzoic acid, 2,4-di(tert-dodecyl)benzoic acid, and 3-tert-octyl-5-tert-nonyl-benzoic acid.

*Example V*

About 180 parts of 4-tert-butylcyclohexanecarboxylic acid produced in Example I was mixed with 150 parts of 2-ethylhexanol, 200 parts of toluene and 3 parts of p-toluenesulfonic acid and the resulting mixture heated under reflux. The water formed during the reaction was removed by distillation with the toluene. After the reaction was complete, the mixture was worked up to recover 2-ethylhexyl 4-tert-butylcyclohexanecarboxylate, a colorless liquid having the following physical properties; 20/4 0.0109 and $n$ 20/D 1.4620. Analysis, ester value eq./100 g. calcd. 0.337, found 0.338.

This ester was highly compatible with poly(vinyl chloride) and the resulting plasticized sheets had good tensile strength and flexibility over a wide range of conditions.

Esters having related properties are obtained by replacing the octyl alcohol in the above-described process with each of the following alcohols: nonyl alcohol, dodecanol, and hexanol.

We claim as our invention:

1. A process for preparing 4-tert-butylcyclohexanecarboxylic acid containing predominant quantities of the lower melting stereoisomer which comprises contacting an aqueous alkaline solution of a sodium salt of tert-butylbenzoic acid with hydrogen at a pressure between 500 to 3000 pounds per square inch and a temperature of 175° C. in the presence of a nickel hydrogenation catalyst, recovering the sodium tert-butylcyclohexanecarboxylate formed thereby and treating it with an acid to convert it into tert-butylcyclohexanecarboxylic acid.

2. A process for preparing 4-tert-butylcyclohexanecarboxylic acid containing predominant quantities of the higher melting stereoisomer which comprises contacting an aqueous solution of an alkali metal salt of tert-butylbenzoic acid containing excess alkali with hydrogen at an elevated pressure and a temperature above 200° C. in the presence of a nickel hydrogenation catalyst, recovering the alkali salt of the tert-butylcyclohexanecarboxylic acid formed thereby and subsequently converting it into tert-butylcyclohexanecarboxylic acid.

3. A process for preparing a 4-tert-alkyl substituted cyclohexane carboxylic acid which comprises contacting an aqueous solution of an alkali metal salt of the corresponding tert-alkyl substituted aromatic acid containing excess alkali with hydrogen at a pressure between 500 and 3000 pounds per square inch and a temperature between 150° C. and 300° C. in the presence of a base metal hydrogenation catalyst, separating out the alkali metal salt of the tert-alkyl substituted cyclohexancarboxylic acid formed in the reaction mixture and treating it with an acid to convert it into the desired tert-alkyl substituted cyclohexanecarboxylic acid.

4. A process for preparing a cyclohexane carboxylic acid having from 2 to 3 ring carbon atoms which are separated from the ring carbon atom bearing the carboxyl group by at least one other ring carbon atom joined to a tertiary alkyl radical containing from 4 to 18 carbon atoms which comprises hydrogenating an alkaline aqueous solution of a salt of the group consisting of the alkali metal, alkaline earth metal and ammonium salts of an aromatic acid corresponding to the aforedescribed cyclohexane carboxylic acid at an elevated pressure and a temperature above 150° C. in the presence of a hydrogenation catalyst, recovering the salt of the tertiary alkyl substituted cyclohexanecarboxylic acid formed in the reaction mixture and converting it to the acid form.

5. A process for preparing a tertiary alkyl-substituted cyclohexane carboxylic acid wherein the ring carbon atom bearing the tertiary alkyl group is at least one carbon atom removed from the ring carbon atom bearing the carboxyl group which comprises hydrogenating an alkaline aqueous solution of a relatively water soluble salt of a corresponding aromatic acid at a temperature above 150° C., and converting the resulting salt of the cyclohexanecarboxylic acid to the desired cyclohexane carboxylic acid.

6. A process for preparing tertiary alkyl-substituted cyclohexanecarboxylic acids of the formula

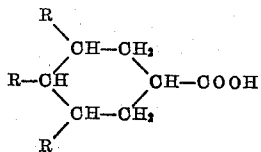

wherein at least one R is a tertiary alkyl radical and the other R's are hydrogen, which comprises contacting an alkaline aqueous solution of a water-soluble salt of the corresponding tertiary alkyl-substituted aromatic acid with hydrogen at an elevated pressure and temperature above 150° C. in the presence of a hydrogenation catalyst, recovering the salt of the tertiary alkyl-substituted cyclohexanecarboxylic acid so produced and converting it to the acid form.

References Cited in the file of this patent
UNITED STATES PATENTS 2,130,989    Schimmelschmidt _____ Sept. 20, 1938

OTHER REFERENCES

Ipatieff et al.: Chem. Abstracts, vol. 21, pages 3608–9 (1927).

Beilstein (Handbuch, 4th ed., 1st supp.), vol. 9, pp. 15, 19 (1932).

Tilford et al.: J. Am. Chem. Soc., vol. 71, pp. 1705–9 (1949).